(12) United States Patent
Liscinsky, III (10) Patent No.: US 7,336,457 B2
(45) Date of Patent: Feb. 26, 2008

(54) GROUND FAULT CIRCUIT INTERRUPTER (GFCI) END-OF-LIFE (EOL) STATUS INDICATOR

(75) Inventor: Stephen M. Liscinsky, III, Stratford, CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 11/198,388

(22) Filed: Aug. 8, 2005

(65) Prior Publication Data
US 2007/0030607 A1   Feb. 8, 2007

(51) Int. Cl.
H02H 3/00 (2006.01)
H02H 9/08 (2006.01)
H01H 73/00 (2006.01)

(52) U.S. Cl. ............................ 361/42; 361/46; 361/115
(58) Field of Classification Search .................. 361/42, 361/46, 115
See application file for complete search history.

(56) References Cited

U.S. PATENT DOCUMENTS

| | | | |
|---|---|---|---|
| 3,629,766 A | 12/1971 | Gould, Jr. | |
| 4,077,056 A | 2/1978 | Galiana | |
| 4,568,997 A | 2/1986 | Bienwald | |
| 4,829,390 A | 5/1989 | Simon | |
| 5,394,289 A | 2/1995 | Yao et al. | |
| 5,418,678 A | 5/1995 | McDonald | |
| 5,661,623 A | 8/1997 | McDonald et al. | |
| 5,715,125 A * | 2/1998 | Neiger et al. | 361/42 |
| 5,835,322 A | 11/1998 | Smith et al. | |
| 5,844,331 A | 12/1998 | Kieser et al. | |
| 6,052,265 A | 4/2000 | Zaretsky et al. | |
| 6,262,871 B1 | 7/2001 | Nemir et al. | |
| 6,442,007 B1 | 8/2002 | Li | |
| 6,590,753 B1 | 7/2003 | Finlay | |
| 6,600,238 B1 * | 7/2003 | Emberty et al. | 307/85 |
| 6,657,834 B2 | 12/2003 | DiSalvo | |
| 2003/0063419 A1 | 4/2003 | Nemir et al. | |

* cited by examiner

*Primary Examiner*—Michael Sherry
*Assistant Examiner*—Dharti H Patel
(74) *Attorney, Agent, or Firm*—Stacey J. Longanecker; Mark S. Bicks; Alfred N. Goodman (57) ABSTRACT

Disclosed is an end-of-life status alarm indication circuit and method for indicating the failure of the primary contacts of a ground fault circuit interruption (GFCI) device to open when a ground fault circuit is detected by the GFCI device. The GFCI device will protect against the situation where the primary contacts of a GFCI device become welded together and will not open when a ground fault circuit is detected by the device. The alarm indication may be either an audible or visual indication.

14 Claims, 5 Drawing Sheets

GROUND FAULT CIRCUIT INTERRUPTER (GFCI) END-OF-LIFE (EOL) STATUS INDICATOR

CROSS-REFERENCE TO RELATED APPLICATIONS

The present invention is related to U.S. Non-provisional patent application Ser. No. 11/497,515 of John R. Baldwin et al. entitled "SELF TESTING GROUND FAULT CIRCUIT INTERRUPTER (GFCI) WITH END OF LIFE (EOL) DETECTION THAT REJECTS FALSE EOL INFORMATION", filed even date herewith , and U.S. Non-provisional patent application Ser. No. 11/198,400 of John R. Baldwin et al. entitled "SELF TESTING DIGITAL FAULT INTERRUPTER", filed even date herewith, the entire contents of said applications being incorporated herein by reference.

FIELD OF THE INVENTION

The present invention relates generally to a ground fault circuit interrupter (GFCI) device that provides an indicator when a GFCI device has reached the end of its useful life. More particularly, the invention relates to a GFCI device that provides an indication that the primary contacts are still in the closed position even though a ground fault has been detected by the GFCI circuit.

BACKGROUND OF THE INVENTION

GFCI devices are designed to trip in response to the detection of a ground fault condition at an AC load. Generally, the ground fault condition results when a person or object comes into contact with the line side of the AC load and an earth ground at the same time, a situation which can result in serious injury. The GFCI device detects this condition by using a sensing transformer to detect an imbalance between the currents flowing in the line and neutral conductors of the AC supply, as will occur when some of the current on the line side is being diverted to ground. When such an imbalance is detected, an electrically-held relay having primary power contacts within the GFCI device is immediately deenergized to place the primary power contacts in an open condition, thereby opening both sides of the AC line and removing all power from the load. Many types of GFCI devices are capable of being tripped not only by contact between the line side of the AC load and ground, but also by a connection between the neutral side of the AC load and ground. The latter type of connection, which may result from a defective load or from improper wiring, is potentially dangerous because it can prevent a conventional GFCI device from tripping at the intended threshold level of differing current between line and neutral when a line-to-ground fault occurs.

GFCI devices may be connected to fuse boxes or circuit breaker panels to provide central protection for the AC wiring throughout a commercial or residential structure. More commonly, however, GFCI devices are incorporated into electrical receptacles that are designed for installation at various locations within a building. A typical receptacle configuration is shown, for example, in U.S. Pat. No. 4,568,997, to Bienwald et al., the entire content of which is incorporated herein by reference. This type of receptacle includes test and reset pushbuttons and a lamp or light-emitting diode (LED) which indicates that the circuit is operating normally. When a ground fault occurs in the protected circuit, or when the test button is depressed, the GFCI device trips and an internal circuit breaker opens both sides of the AC line. The tripping of the circuit breaker causes the reset button to pop out and the LED to be extinguished, providing a visual indication that a ground fault has occurred. In order to reset the GFCI device, the reset button is depressed in order to close and latch the circuit breaker, and this also causes the LED to illuminate once again.

Ground fault protection from miswiring is also provided. Specifically, GFCI receptacles of the type described above may be erroneously connected with the incoming AC source conductors being tied directly to the load or feedthrough terminals of the receptacle rather than to the source terminals. Because of the nature of the internal wiring of the GFCI receptacle, this miswiring condition is not easily detected. AC power will still be present at the receptacle outlets, making it appear that the receptacle is operating normally. If the test push button is depressed, the latching mechanism within the GFCI receptacle will be released and the reset push button will pop out, again making it appear that the GFCI receptacle is operating normally and providing the desired ground fault protection. In reality, however, no such protection is being provided because the AC source has been wired directly to the receptacle outlets without passing through the internal circuit breaker of the GFCI device.

Furthermore, a user may not know the state the GFCI is in without having to operate the test and reset buttons. Therefore, a visual indication should be provided to indicate to a user the different states the GFCI is in.

As a GFCI device is repeatedly tested or is frequently interrupting the power-supply circuit, its primary contacts begin to wear and, over time, the primary contacts do not have sufficient area or contact pad left to effectively withstand the severe electrical consequences of interrupting an energized circuit, in particular, arcing. When the GFCI device primary contacts are at the end of their useful life, one of several possible failures is the welding together of the primary contacts. In this failure condition, the electrical power circuit to the load is not interrupted even though the GFCI circuit signaled that a fault has occurred and the circuit responded as designed (i.e., operated in a manner that would have normally opened the primary contacts), which normally would interrupt the electrical power circuit to the load. This is a potentially hazardous condition because the conventional GFCI device has signaled a fault, but the appliance or tool that may be causing the fault is still connected to a power supply. Underwriters Laboratory® has begun to address this issue by announcing a proposed requirement for an end-of-life status indicator for GFCI devices. It is anticipated that the Underwriters Laboratory® will issue a notice making the proposed requirement an official requirement in the 2005 calendar year.

It is also possible that the conventional GCFI circuit would indicate that no fault has occurred, which would potentially harm a user through continued use of an appliance or tool that is in an unsafe condition.

SUMMARY OF THE INVENTION

The above disadvantages and other objectives are substantially achieved by a system and method employing a ground fault circuit interrupter (GFCI) device in accordance with the principles of the present invention. The method and GFCI device comprises an indicator circuit that provides an indication that the primary relay contacts of a GFCI device have reached the end of the contacts' useful life.

In another aspect of the invention, a device and method are provided for indicating when the primary relay contacts are welded together and power is still available at the receptacle, even though a ground fault has been detected and the GFCI circuit has indicated that the fault has occurred.

Another aspect of the present invention is that visual indications are provided to alert a user to the status of the GFCI. For example, the user is made aware that the GFCI is operating as a receptacle without GFCI protection.

In one embodiment, a MOSFET transistor, which has power removed from it when a conventional GFCI circuit detects a fault, removes power from an LED in an optocoupler. In turn, the transistor in the optocoupler turns off removing a short circuit from a network circuit thereby allowing an alarm circuit to flash, if the main contacts are still closed.

In another embodiment of the present application, a network of bi-polar transistors act as a switch and activate a LED in an optocoupler when a conventional GFCI circuit detects a fault. In turn, the switching mechanism in the optocoupler applies power to a network circuit thereby allowing an alarm circuit to flash, if the main contacts are still closed.

BRIEF DESCRIPTION OF THE DRAWINGS

Referring now to the drawings, which form a part of the original disclosure.

Throughout the drawings, it should be understood that like reference numbers refer to like features, structures and elements.

DETAILED DESCRIPTION OF THE EXEMPLARY EMBODIMENTS

The typical operation of a conventional GFCI receptacle will be explained with reference to FIG. 1. Generally, it can be seen that a conventional ground fault circuit interrupter (GFCI) device 100 has an interrupt module comprising a relay with contacts 124 and 126, and a test switch 200 having primary test switch contacts 220 and secondary test switch contacts 230. The contacts 124 and 126 break a plurality of conductive paths between source terminals 108, 110 and load terminals 114, 116 of an AC receptacle in response to an imbalance of current flow in the paths.

The GFCI device 100 includes the pair of input (or source) terminals 108 and 110 which are adapted to be connected to the line (L) and neutral (N) terminals, respectively, of an AC power source 107. Within the GFCI device 100, a first conductor 176 connects the AC line input terminal 108 to a corresponding AC line output (or load) terminal 114, and a second conductor 174 connects the AC neutral input terminal 110 to a corresponding AC neutral output (or load) terminal 116. A transient voltage suppressor 202 is connected across the input terminal 108 and 110 to provide protection from voltage surges due to lightning and other transient conditions. The output terminals 114 and 116 are connected, respectively, to the line and neutral input terminals of an AC load (not shown). The conductive paths established by the conductors 176 and 174 are selectively made and broken by first and second relay contact sets 124 and 126, respectively, in order to selectively connect and disconnect the input terminals 108 and 110 from the output terminals 114 and 116. For convenience, the position of the primary relay contact sets 124 and 126 shown in FIG. 1 will be referred to in the description which follows as the "open" position, the "closed" position being opposite to that shown since it is the opening and closing of the AC line in neutral conductors 176 and 174 that is of principal interest in understanding the operation of GFCI device 100.

Main relay primary contacts 124 and 126 are connected, respectively, to dedicated receptacle contacts. Specifically, hot receptacle contact 198 is connected to relay contact 124 and neutral receptacle contact 199 is connected to relay primary contact 126. The dedicated receptacle contacts 198 and 199 are structured and arranged to allow the wires of an AC power source 107 to be connected to the receptacle contacts 198 and 199 of the GFCI 100 and are electrically isolated from the load lines 114 and 116 when the relay contacts 124 and 126 are open. Thus, power is removed from the receptacle contacts 198 and 199 when there is an imbalance in current flow and/or when the GFCI 100 is locked out due to miswiring from being wired or powered from the load side rather than the line side. When load contacts 124 and 126 are closed, on the other hand, the receptacle contacts 198 and 199 enable the receptacle face to receive power.

The main relay primary contact sets 124 and 126 are operated substantially simultaneously by solenoid 128. The main relay solenoid 128, when energized, holds both primary contacts 124 and 126 in a closed position, which is the position opposite to the open position, which is that shown, thereby establishing a continuous conductive path between the input terminals 108 and 110 and output terminals 114 and 116 and delivering power from the AC source 107 to the load. When the solenoid 128 is de-energized, the relay primary contact sets 124 and 126 are both moved to the open position illustrated in FIG. 1 by means of a biasing spring (not shown) within the relay, thereby interrupting the conductive path 174 and 176 and removing AC power from the load. The solenoid 128 is de-energized in response to the detection of a ground fault condition or miswiring, in a manner to be described below, and prevents any electrical shock hazard by immediately and simultaneously removing power from both sides of the AC load when such a condition is detected.

It will be appreciated by those skilled in the art that GFCI device 100 should be wired with the AC source 107 at the line side and not at the load side. GFCI 100 is structured and arranged to require the electronics to be powered from the line side and to provide no power to the electronics when the GFCI device 100 is miswired and powered from the load side.

Figure 1:
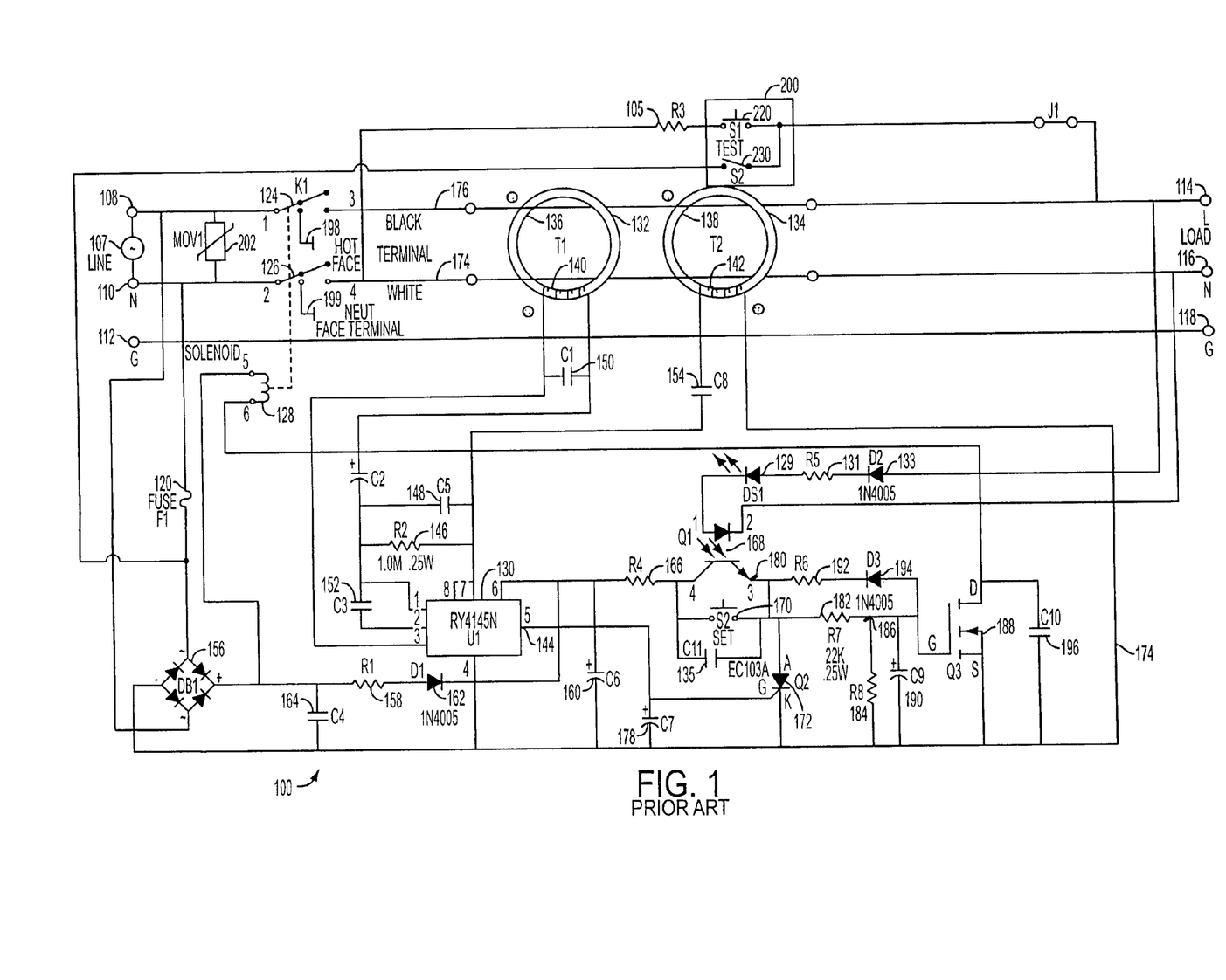
FIG. 1 is a schematic diagram of a conventional GFCI device.

As shown in FIG. 1, the relay primary contacts 124 and 126 are each of the single-pole double-throw (SPDT) type and, when in a closed position, serve to connect the AC line and neutral conductors 176 and 174 across a shunt path comprising a diode 129, a diode 133 and a current limiting resistor 131 arranged in series. It will be appreciated by those skilled in the art that the diode 129 may be a light emitting diode to provide a visual indication that the GFCI device 100 is off either because a ground fault has occurred or the device has not been set.

The detection of the ground fault condition is implemented by a current sensing circuit which comprises a pair of transformers 132 and 134, a commercially available GFCI controller 130, and various interconnecting components. It will be appreciated that the latching system described above selectively completes the conductive paths based on a switching signal. The sensing circuit selectively generates the switching signal based on whether current flow in the conductive paths is balanced within a predetermined threshold. The GFCI controller 130 is preferably a type RV 4145N integrated circuit manufactured by the Semiconductor Division of Fairchild Semiconductor, located in South Portland, Me.

The conductors 176 and 174 pass through the magnetic cores 136 and 138 of the two transformers 132 and 134, as shown, with the secondary coil 140 of the transformer 132 being connected to the input of the GFCI controller 130 and the secondary coil 142 of the transformer 134 being connected between the GFCI controller 130 and the AC neutral conductor 174. The transformer 132 serves as a differential transformer for detecting a connection between the line side of the AC load and an earth ground, while the transformer 134 serves as a grounded neutral transformer for detecting a connection between the neutral side of the AC load and an earth ground. In the absence of a ground fault, the currents flowing through the conductors 176 and 174 will be equal and opposite, and no net flux will be generated in the core 136 of the differential transformer 132.

In the event that a connection occurs between the line side of the AC load and the ground, however, the current flowing to the conductors 176 and 174 will no longer precisely cancel and the net flux will be generated in the core 136 of the transformer 132. This flux will give rise to a potential of the output of the secondary coil 140, and this output is applied to the inputs of the GFCI controller 130 to produce a trip signal on the output line 144. If the ground fault condition results from the neutral side of the AC load accidentally being connected to ground, a magnetic path is established between the differential transformer 132 and grounded neutral transformer 134. When this occurs, a positive feedback loop is created around an operational amplifier within the GFCI controller 130, and the resulting oscillations of the amplifier will likewise give rise to the trip signal on line 144.

Since the GFCI controller 130 is a commercially available component, its operation is well known and need not be described in detail. In utilizing this device, the resistor 146 serves as a feedback resistor for setting the gain of the controller and hence its sensitivity to normal faults and the capacitor 148 in parallel with the resistor 146 provides noise filtering. Capacitors 150 and 152 provide noise filtering at the inputs of the controller, and capacitor C2 provides AC input coupling. Capacitor 154 serves as a portion of the oscillatory circuit for the grounded neutral transformer 134.

The GFCI controller 130 is powered from the AC input terminals 108 and 110 by means of a full-wave power supply comprising the diode bridge 156, a current limiting resistor 158 and a filter capacitor 160. The power output of the diode bridge is also connected to one side of the solenoid 128, and diode 162 prevents the capacitor 160 from discharging through the solenoid 128. A capacitor 164 provides noise filtering across the outputs of the diode bridge 156. The line and neutral conductors 176 and 174, respectively, pass through the magnetic cores 136 and 138 of the transformers 132 and 134, as shown, with the secondary coil 140 of the transformer 132 being connected to the input of the GFCI controller 130 and the secondary coil 142 of the transformer 134 being connected between the GFCI controller 130 and the negative output terminal of the diode bridge 156.

In the absence of a ground fault condition, no output is produced by the GFCI controller 130 on line 144. Under these circumstances, current flows through a trip circuit to provide a control signal input to a further circuit which controls energizing the solenoid coil 128. The trip circuit comprises a limiting resistor 166 connected to the positive terminal of the filter capacitor 160, a controlled switching device in the form of an opto-isolator 168 having its collector connected to the opposite terminal of the resistor 166, a push button switch 170 connected across the collector and emitter of the opto-isolator 168 to serve as a set/reset, and a switching or shunting circuit in the form of a silicon controlled rectifier (SCR) 172 having its anode connected to the emitter of the opto-isolator 168 and its cathode to the neutral conductor 174.

A capacitor 135 is bridged across push button switch 170. The node 180 between the emitter of the output isolator 168 and the anode of the SCR 172 is connected to the output line 144 connected to the GFCI controller 130. A capacitor 178 is connected between the gate of the SCR 172 and the AC neutral conductor 174 to serve as a filter for preventing narrow noise pulses from triggering the SCR. In the absence of a gating signal on line 144, the SCR 172 does not conduct. When a ground fault condition occurs, the GFCI controller 130 causes the output line 144 to go high thereby gating the SCR 172 into conduction, shorting the emitter of opto-isolator 168 directly to the AC neutral conductor 174, and thus removing power from the input of the relay coil circuit. Removal of the control signal from the solenoid circuit causes the solenoid 128 to become de-energized thereby opening the relay contact sets 124 and 126 and removing AC power from the load terminals 108 and 110.

As is well known, a SCR 172 will continue to conduct as long as current flows between its anode and cathode, even after the gating signal is removed. Thus, the SCR 172 will continue to maintain the solenoid 128 in a de-energized condition, and the contact sets 124 and 126 open, even after the ground fault condition has disappeared and the output of the GFCI controller 130 on line 144 has been restored to a zero voltage level. Thus, the operation of the circuit 100 is similar to that of a receptacle-type GFCI device employing a mechanical circuit breaker, in that disappearance of a ground fault condition does not restore power to the AC load until a manual reset button 170 is pushed. The button 170 must also be pushed to provide power to the load when the GFCI device is initially powered up, or to restore power to the load after a power supply interruption at the AC source 107.

The node 180 between the emitter of opto-isolator 168 and the anode of the SCR 172 corresponds to the input of a circuit, which controls the energization of the solenoid 128. This circuit comprises resistors 182 and 184, which are connected in series between the node 180 and the AC neutral conductor 174 to form a voltage divider. The node 186 between the two resistors is connected to the gate input (G) of a metal-oxide-semiconductor field effect transistor (MOSFET) 188, and the source terminal (S) of the MOSFET 188 is connected to the AC neutral conductor 174. The drain terminal (D) of MOSFET 188 is connected to one side of the GFCI controller 130 via solenoid 128, resistor 158 and diode 162, and the opposite side of the grounded neutral conductor 174. Thus, when the MOSFET 188 is gated into conduction, AC current will flow to the solenoid 128 and maintain the relay contact sets 124 and 126 in a closed position. When the solenoid 128 is de-energized by shorting the MOSFET 188 by triggering SCR 172, the relay contact sets 124 and 126 will open to remove power from the AC load.

In greater detail, the gating of the MOSFET 188 in the relay coil circuit is controlled by the voltage at the node 186 between the voltage divider resistor 182 and 184, and this voltage will in turn depend upon the presence of a control signal at node 180 of the relay coil circuit as determined by the state of the SCR 172 of the trip circuit. A filter capacitor 190 is connected between the gate terminal of the MOSFET 188 and the AC neutral conductor 174, in order to prevent the MOSFET 188 from being gated by noise pulses. A resistor 192 and diode 194 will allow capacitor 190 to discharge quickly when the SCR 172 goes into conduction, thereby allowing for a rapid turnoff of the MOSFET 188. A capacitor 196 is connected between the drain and source terminals of the MOSFET 188 in order to prevent the MOSFET 188 from being triggered into conduction by rapid changes and the drain source voltage a phenomenon known as dV/dT phase triggering. Such a device has been disclosed in U.S. Pat. No. 6,697,238, which is assigned to the assignee of the instant application, the entire disclosure of which is incorporated herein by reference.

Figure 2:
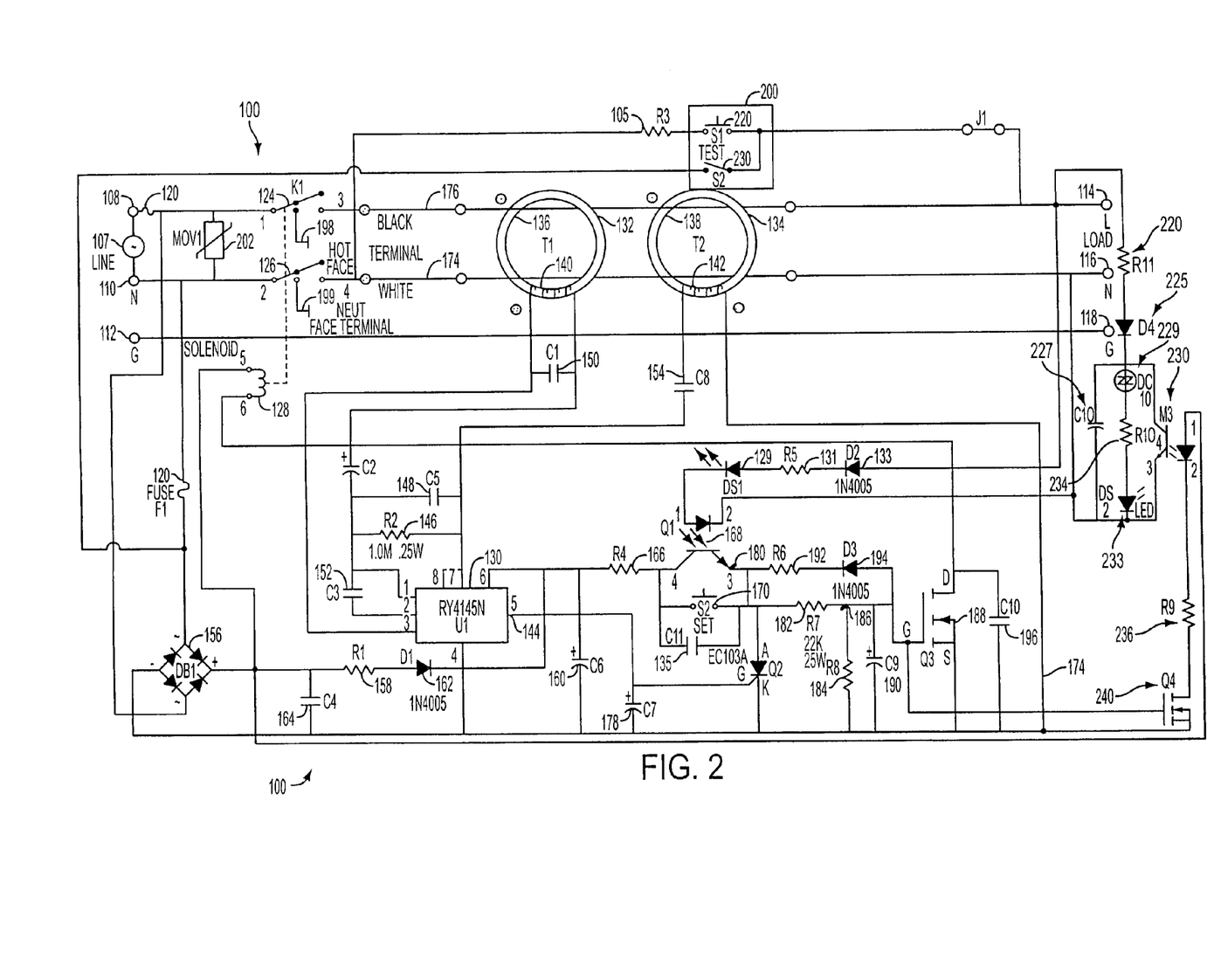
FIG. 2 is a schematic diagram of a conventional GFCI device which is adapted to have an alarm circuit according to an embodiment of the present invention.

The operation of the end-of-life status alarm will now be described with reference to FIG. 2. The circuit that the end-of-life status alarm indication comprises a switching circuit and an alarm circuit. The switching circuit comprises a MOSFET 240, a resistor 236, an opto-coupler 230. The alarm circuit comprises light emitting diode 233, resistor 234, capacitor 227, diode 225 and resistor 220. The gate of MOSFET 240 in the switching circuit is connected to the gate of MOSFET 188, which is in the conventional GFCI circuit. As stated above, when a fault is detected by the GFCI circuit, the GFCI controller 130 outputs a low voltage signal on line 144 indicating that a fault is present. The low voltage signal on line 144, in addition causing MOSFET 188 to turn off, also, in the present embodiment, turns off MOSFET 240. With MOSFET 240 turned off, the circuit that typically supplies power to the opto-coupler 230 is now an open-circuit, therefore, the opto-coupler 230 no longer conducts and switches off. Since opto-coupler 230 no longer conducts, the circuit path that previously by-passed, or shorted the end-of-life status alarm indicator circuit components, is now an open circuit. Power is now supplied to the end-of-life status alarm indicator circuit. The circuit path for the end-of-life status alarm indicator circuit is from the load side hot through diac DC10 229, resistor R10 234, and light-emitting diode (LED) 233 with capacitor C10 227 connected in parallel with diac 229, resistor 234 and LED 233. If the load side of the GFCI device is still energized, the end-of-life status alarm indicator circuit as described in the above circuit will be energized and the LED 233 will begin to flash, preferably, at the rate of about once every second. The flashing LED 233 indicates that the main relay contacts 124 and 126 are still closed and that power is still available at the load even though a ground fault has been indicated by the GFCI controller 130.

Figure 3:
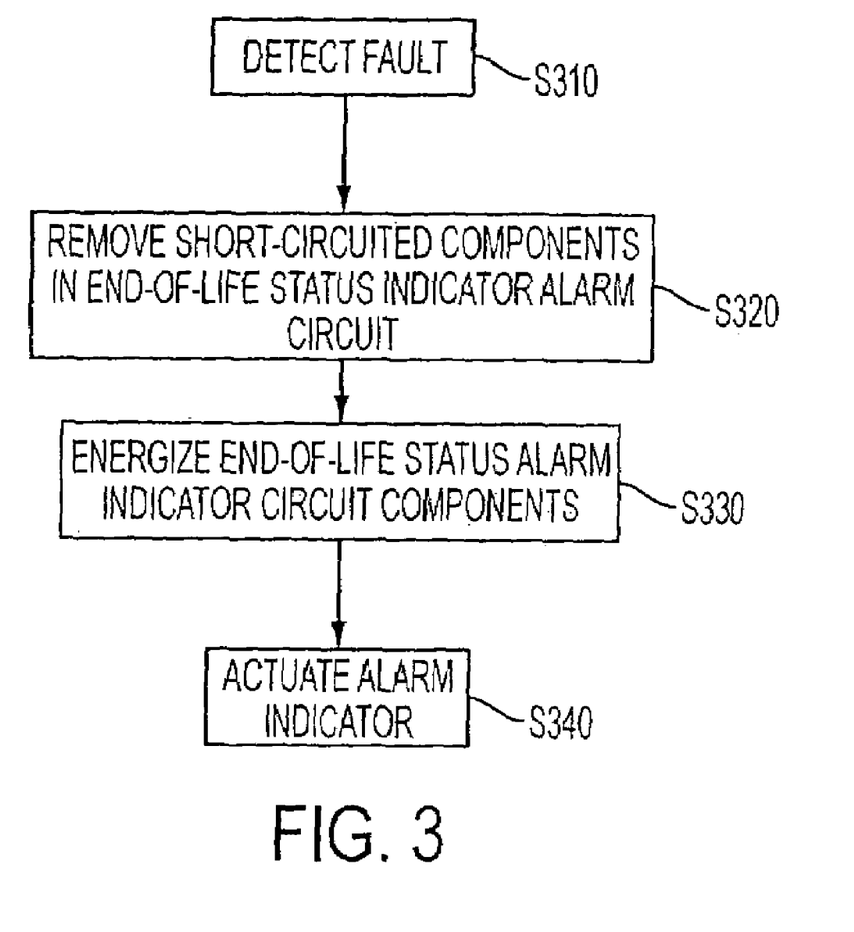
FIG. 3 is a flowchart of the method of indicating the end of the useful life of a GFCI device according to an embodiment of the present invention.

An embodiment of the method for indicating the end-of-life status of GFCI primary relay contacts as implemented in FIG. 2 will now be explained with reference to FIG. 3. In step S310, the GFCI controller 130 detects a potential on transformer 132, which is an indication that a line to ground fault has occurred, in which case, the GFCI controller 130 outputs a fault indication on output line 144. Once a fault indication is output from GFCI controller 130, a switching circuit removes the circuit components, such as MOSFET Q4 240 and opto-coupler 230, which were short circuiting the alarm indicator circuit (Step S320). It is assumed that primary contacts 124 and 126 remain closed due to a failure, thereby continuing to provide power to the load side of the GFCI device. With power removed from the MOSFET Q4 240, the circuit components comprising the end-of-life status alarm indicator are energized due to the continued presence of power at the load side of the GFCI device (Step S330). Finally, in step S340, the alarm circuit is energized because of the power available at the load side of the GFCI device and provides a visual alarm preferably comprising a flashing LED.

Figure 4:
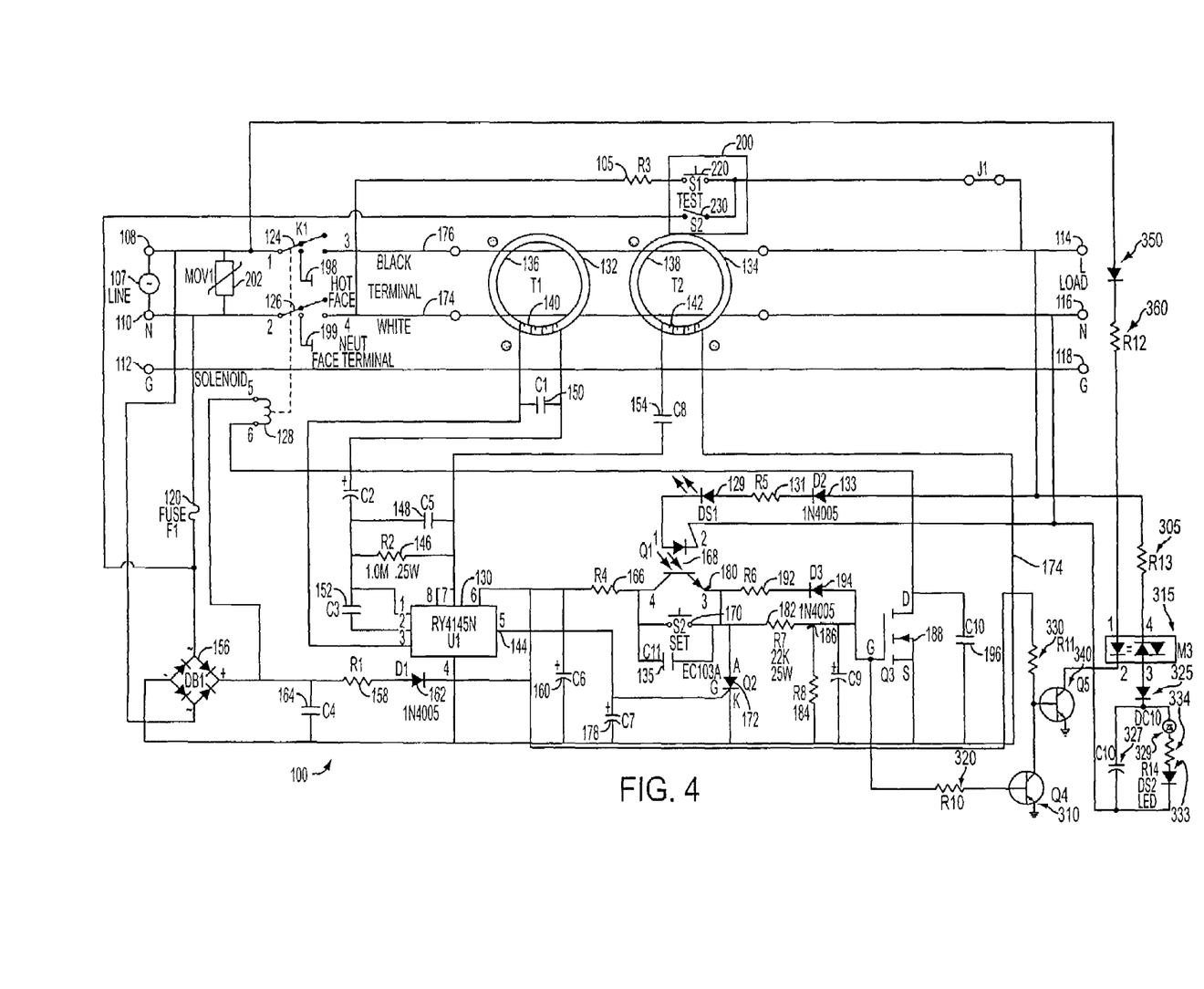
FIG. 4 is a schematic diagram of a conventional GFCI device which is adapted to have an alarm circuit according to an embodiment of the present invention.

Another embodiment of the present invention will now be described with reference to FIG. 4. When a ground fault is detected by the GFCI controller 130, the end-of-life status alarm indicating circuit comprising a switching circuit and an alarm circuit, as shown in FIG. 4, is actuated. When a fault is detected, as stated above, the voltage at the gate terminal of MOSFET Q3 188 drops and the MOSFET Q3 188 no longer conducts. This open circuit causes a chain reaction that energizes the end-of-life status alarm circuit.

A switching circuit comprising transistor Q4 310, resistor 320, transistor Q5 and opto-coupler 315 is actuated. The transistor Q4 310 and resistor 320, which are connected in series, are connected to the gate terminal of MOSFET Q3 188. When the voltage is high at the gate terminal of MOSFET Q3 188, the transistor Q4 310 conducts, which completes a circuit path from pin 6 of the GFCI controller 130 through resistor R11 330 and transistor Q4 310 to ground. While transistor Q4 310 conducts, transistor Q5 340 remains open or is switched off. The base of transistor Q5 340 is connected between resistor R11 330 and the collector of transistor Q4 310, the emitter of transistor Q5 340 now is connected to ground and the collector of transistor Q5 340 is connected to pin 2 of the opto-coupler U3 315. When the voltage at the base of transistor Q4 310 drops, transistor Q4 310 acts as an open circuit, in which case, transistor Q5 340 begins to conduct thereby completing the circuit from the line side of contactor K1 through diode 350, resistor 360 and the light emitting diode of opto-coupler U3 315 to ground. Once the opto-coupler U3 315 is turned on, the end-of-life status alarm circuit, which preferably comprises resistor R13 305, diode 325, diac 329, resistor R14 334, light-emitting diode 333 and capacitor 327, is powered and operates as described above with reference to FIG. 2. The end-of-life status alarm indicator circuit of FIG. 4 is supplied power from the load side hot conductor 176 and is completed by capacitor C10 327 and LED 333, which are connected in parallel, connecting to neutral conductor 174.

In the above embodiment of the end-of-life status alarm indicator circuit preferably comprising diac 329, resistor 334, LED 333 and capacitor C10 327, the LED 333 will flash at the rate of about once every second. Of course, the values of the end-of-life status alarm indicator circuit components can be changed to alter the flash rate to meet any flash rate requirements.

Figure 5:
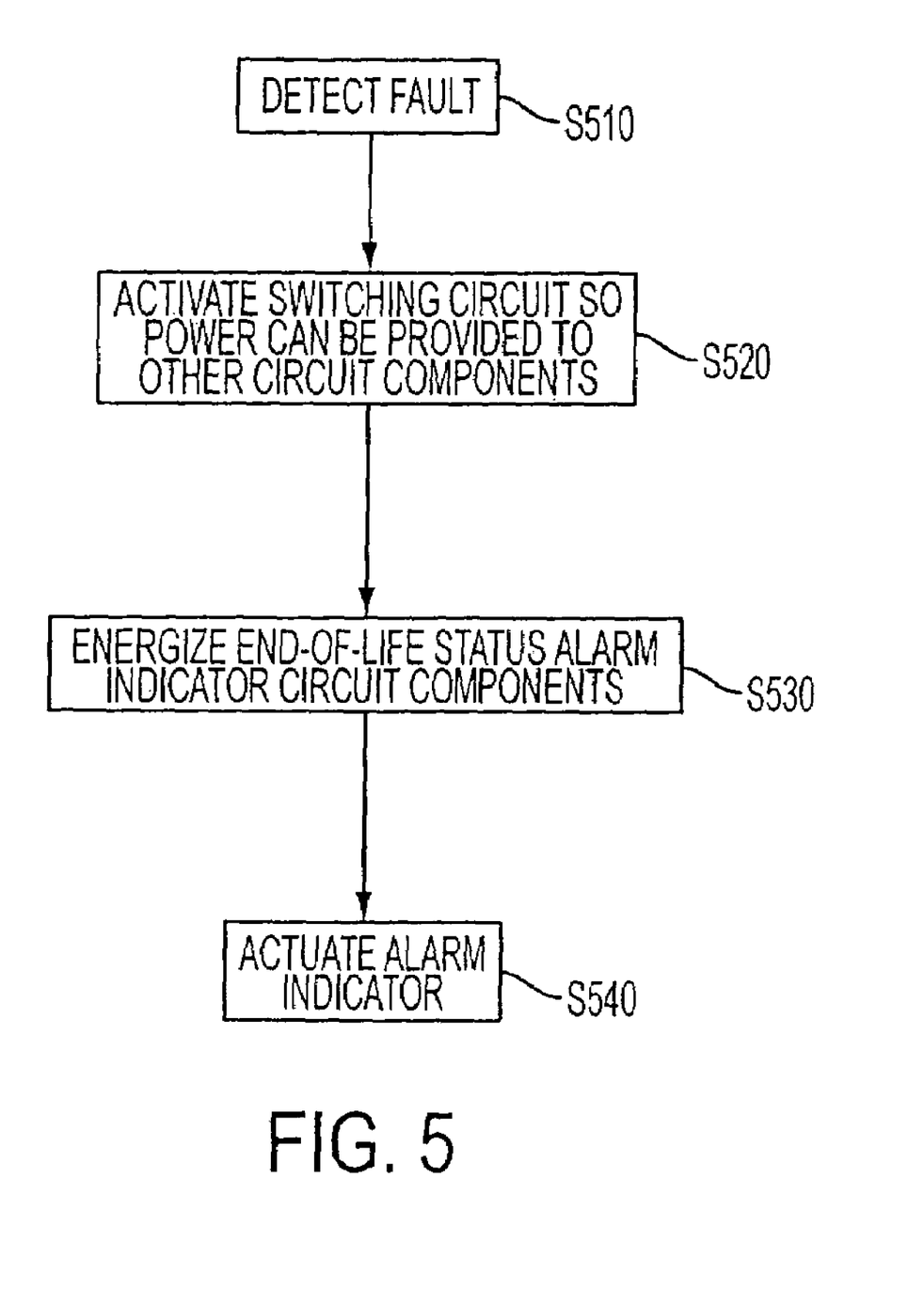
FIG. 5 is a flowchart of the method of indicating the end of the useful life of a GFCI device according to an embodiment of the present invention.

An embodiment of the method for indicating the end-of-life status of GFCI primary relay contacts as implemented in FIG. 4 will now be explained with reference to FIG. 5. In step S510, the GFCI controller 130 detects a potential on transformer 132, which is an indication that a line to ground fault has occurred, in which case, the GFCI controller 130 outputs a fault indication on output line 144. Once a fault indication is output from GFCI controller 130, a switching circuit is activated to remove power from the circuit components, such as MOSFET Q3 188 and transistor Q4 310, which results in power being provided to transistor Q5 340 causing it to conduct (Step S520). It is assumed that primary contacts 124 and 126 of contactor K1 remain closed due to a failure, thereby continuing to provide power to the load side of the GFCI device. With power removed from the transistor Q4 310, transistor Q5 340 now conducts causing the LED in opto-coupler 315 to drive the triac because the circuit from the power supplied by line-side hot conductor 176 through diode 350, resistor 360, the LED of opto-coupler 315 and transistor Q5 340 is completed by connection to neutral conductor 174 (Step S520). Circuit components comprising the end-of-life status alarm indicator are now energized due to the continued presence of power at the load side of the GFCI device and due to the LED driving the triac to conduct (Step S530). Finally, in step S540, with power available the alarm circuit is energized and provides a visual alarm preferably comprising a flashing LED.

The embodiments of the present invention have been described as indicating the occurrence of a single failure, which is the welding of the primary contacts 124 and 126 to their respective load-side contact pad. However, other failure conditions may also be indicated by embodiments of the present invention, such as the failure of MOSFET 188 due to short-circuiting, the failure of SCR 172, a failure of the GFCI controller 130 and the failure of opto-coupler 168. All of these failure conditions potentially result in the primary power contacts 124 and 126 to remain in the closed position even though a ground fault circuit exists.

The present invention has been described with respect to the above exemplary embodiments, which should not be considered as limiting. One of ordinary skill in the art may derive modifications to the above embodiments without deviating from the scope of present invention.

What is claimed is:

1. An end-of-life status alarm indicator for ground fault circuit interrupter (GFCI) apparatus comprising:
    a primary contact relay for opening and closing primary power contacts, wherein said power contacts are respectively located in first and second conductive paths and allow current to be supplied to the load side of said GFCI apparatus;
    a control circuit for detecting the occurrence of an imbalance in the current flow through first and second conductive paths that is indicative of a ground fault condition at an AC load connected to said GFCI apparatus and generating an imbalance occurrence signal;
    an imbalance response circuit for deenergizing said primary contact relay in response to said imbalance occurrence signal from said control circuit, wherein said primary contact relay when deenergized allows the primary power contacts of the GFCI apparatus to open;
    an end-of-life (EOL) status alarm indicator circuit having an indicator for providing an indication when a current flow imbalance occurs and said primary contacts fail to open when said primary contact relay is deenergized, said EOL status alarm indicator circuit being configured to receive power from said load side to energize said indicator when the primary contacts are closed and said primary contact relay of the GFCI apparatus is deenergized; and
    a switching circuit comprising semiconductor devices for shorting a circuit path necessary for said EOL status alarm indicator circuit to provide said indication of said failure of said primary power contacts to open, and controllably opening the short circuit to allow said EOL status alarm indicator circuit to use said circuit path to receive power from said load side and energize said indicator to provide said indication.

2. The end-of-life status alarm indicator of claim 1, wherein said switching circuit comprises a MOSFET semiconductor device, a resistor, and an opto-coupler.

3. The end-of-life status alarm indicator of claim 2, wherein the MOSFET semiconductor device, the resistor and the opto-coupler are connected in series.

4. An end-of-life status alarm indicator for ground fault circuit interrupter (GFCI) apparatus comprising:
    a primary contact relay for opening and closing primary power contacts, wherein said power contacts are respectively located in first and second conductive paths and allow current to be supplied to the load side of said GFCI apparatus;
    a control circuit for detecting the occurrence of an imbalance in the current flow through first and second conductive paths that is indicative of a ground fault condition at an AC load connected to said ground fault circuit interrupter (GFCI) apparatus and generating an imbalance occurrence signal;
    an imbalance response circuit for deenergizing said primary contact relay in response to said imbalance occurrence signal from said control circuit, wherein said primary contact relay when deenergized allows the primary power contacts of the GFCI apparatus to open;
    an end-of-life status alarm indicator circuit for providing an indication when a current flow imbalance occurs and said primary contacts fail to open when said primary contact relay is deenergized; and
    a switching circuit comprising semiconductor devices for closing a circuit path necessary for said end-of-life status alarm indicator circuit to provide said indication of said failure of said primary power contacts to open;
    wherein said switching circuit comprises a plurality of transistors, a resistor, and opto-coupler.

5. The end-of-life status alarm indicator of claim 4, wherein the plurality of transistors comprises first and second transistors, wherein the base of the first transistor is connected to the collector of the second transistor and the collector of the first transistor is connected to the opto-coupler.

6. The end-of-life status alarm indicator of claim 1, wherein the end-of-life status alarm indicator circuit comprises a diac, at least one resistor, a light-emitting diode and a capacitor.

7. An end-of-life status alarm indicator for ground fault circuit interrupter (GFCI) apparatus comprising:
    a primary contact relay for opening and closing primary power contacts, wherein said power contacts are respectively located in first and second conductive paths and allow current to be supplied to the load side of said GFCI apparatus;
    a control circuit for detecting the occurrence of an imbalance in the current flow through first and second conductive paths that is indicative of a ground fault condition at an AC load connected to said ground fault circuit interrupter (GFCI) apparatus and generating an imbalance occurrence signal;
    an imbalance response circuit for deenergizing said primary contact relay in response to said imbalance occurrence signal from said control circuit, wherein said primary contact relay when deenergized allows the primary power contacts of the GFCI apparatus to open; and
    an end-of-life status alarm indicator circuit for providing an indication when a current flow imbalance occurs and said primary contacts fail to open when said primary contact relay is deenergized;

wherein the end-of-life status alarm indicator circuit comprises a diac, at least one resistor, a light-emitting diode and a capacitor; and wherein the diac is connected in series with a resistor and the light-emitting diode and connected in parallel to the diac, resistor and light-emitting diode is the capacitor, wherein the light-emitting diode flashes at the rate of about once every second.

8. A method for indicating the end-of-life status of a ground fault circuit interruption (GFCI) device when the primary contacts that allow current to be supplied to the load side of the GFCI device fail to open, comprising the steps of:

outputting a ground fault signal that a ground fault has occurred;

switching circuit paths to remove circuit components, which had formed a circuit that by-passed an end-of-life status alarm indicator circuit;

energizing said end-of-life status alarm indicator circuit components from the load side due to failure of said primary contacts to open; and providing an indication that the primary contacts are in the closed position and a ground fault signal has been output.

9. The method of claim 8, wherein said end-of-life status alarm indicator circuit is energized because of the failure of the primary contacts to open, which allows power to be available at the load side of the GFCI device.

10. The method of claim 8, wherein said end-of-life status alarm indicator provides a visual alarm that the end-of-life status indicator alarm is activated.

11. The method of claim 9, wherein in said indication is provided by a circuit comprising a light-emitting diode flashing at a predetermined rate.

12. The method of claim 9, wherein said step of switching circuit paths comprises removing voltage from circuit components within said switching circuit.

13. The method of claim 9, wherein said step of switching circuit paths comprises removing voltage from circuit components within said end-of-life status indicator alarm circuit.

14. The method of claim 8, wherein said indication is an audible indication.

* * * * *